(12) United States Patent
Hiller

(10) Patent No.: US 8,662,964 B2
(45) Date of Patent: Mar. 4, 2014

(54) PROTECTIVE HOOD FOR PORTABLE ELECTRIC POWER TOOLS, AND PORTABLE ELECTRIC POWER TOOLS

(75) Inventor: Matthias Hiller, Aichtal (DE)

(73) Assignee: Metabowerke GmbH, Nuertingen (DE)

( * ) Notice: Subject to any disclaimer, the term of this patent is extended or adjusted under 35 U.S.C. 154(b) by 287 days.

(21) Appl. No.: 13/138,859

(22) PCT Filed: Apr. 8, 2010

(86) PCT No.: PCT/EP2010/002187
§ 371 (c)(1),
(2), (4) Date: Oct. 11, 2011

(87) PCT Pub. No.: WO2010/115620
PCT Pub. Date: Oct. 14, 2010

(65) Prior Publication Data
US 2012/0052778 A1 Mar. 1, 2012

(30) Foreign Application Priority Data
Apr. 11, 2009 (DE) .......................... 10 2009 017 299

(51) Int. Cl.
*B24B 23/00* (2006.01)

(52) U.S. Cl.
USPC ............ 451/358; 451/451; 451/454; 451/344

(58) Field of Classification Search
USPC ......... 451/344, 359, 357, 451, 452, 457, 456; 411/393, 399; 403/21, 22
See application file for complete search history.

(56) References Cited

U.S. PATENT DOCUMENTS

| | | | | |
|---|---|---|---|---|
| 2,922,261 | A * | 1/1960 | Rabkin et al. | 451/359 |
| 3,068,620 | A * | 12/1962 | Tocci-Guilbert | 451/451 |
| 3,793,784 | A * | 2/1974 | Jetzt | 451/452 |
| 4,506,917 | A * | 3/1985 | Hansen Arne | 285/4 |
| 4,924,635 | A * | 5/1990 | Rudolf et al. | 451/344 |
| 5,351,368 | A * | 10/1994 | Borst | 24/270 |
| 5,545,082 | A * | 8/1996 | Courson et al. | 451/456 |
| 5,766,062 | A * | 6/1998 | Edling | 451/451 |
| 6,464,573 | B1 * | 10/2002 | Keller | 451/451 |
| 6,669,544 | B1 * | 12/2003 | Walz et al. | 451/454 |
| 6,893,334 | B1 * | 5/2005 | Stivers | 451/359 |
| 6,949,017 | B2 * | 9/2005 | Koschel et al. | 451/358 |
| 6,988,939 | B2 * | 1/2006 | Hofmann et al. | 451/344 |
| 7,014,547 | B2 * | 3/2006 | Kleider | 451/359 |
| 7,063,606 | B2 * | 6/2006 | Stierle et al. | 451/359 |
| D537,692 | S * | 3/2007 | Aglassinger | D8/70 |
| 7,311,589 | B2 * | 12/2007 | Wiker | 451/451 |
| 7,524,239 | B2 * | 4/2009 | Schmidberger-Brinek et al. | 451/451 |

(Continued)

FOREIGN PATENT DOCUMENTS

| | | | | |
|---|---|---|---|---|
| DE | 38 28 450 A1 | | 3/1990 | |
| DE | 3940584 A1 * | | 6/1991 | B24B 55/05 |

(Continued)

*Primary Examiner* — George Nguyen
(74) *Attorney, Agent, or Firm* — Paine Hamblen, LLP

(57) ABSTRACT

A protective hood of portable electric power tools, and a portable electric power tool is described, and wherein a protective hood is provided and which can be selectively located relative to a rotating drive shaft, and wherein a clamping band is provided which mounts a screw that can be radially threadably advanced toward the rotating drive shaft and which further carries an anti-rotation locking element having claws which mechanically engage a machine neck thereby reliably and securely fastening the protective hood to the power tool.

14 Claims, 4 Drawing Sheets

(56) References Cited

U.S. PATENT DOCUMENTS

| | | | |
|---|---|---|---|
| 7,628,682 B2* | 12/2009 | Andrasic et al. | 451/451 |
| 7,892,075 B2* | 2/2011 | Esenwein | 451/451 |
| 7,909,680 B2* | 3/2011 | Boeck et al. | 451/344 |
| 7,927,191 B2* | 4/2011 | Esenwein | 451/451 |
| 7,955,162 B2* | 6/2011 | Boeck et al. | 451/451 |
| 8,221,197 B2* | 7/2012 | Boeck et al. | 451/344 |
| 2004/0014412 A1* | 1/2004 | Hofmann et al. | 451/451 |
| 2006/0068690 A1* | 3/2006 | Koschel et al. | 451/451 |
| 2008/0200103 A1 | 8/2008 | Esenwein | |
| 2009/0029635 A1 | 1/2009 | Boeck et al. | |
| 2009/0098812 A1* | 4/2009 | Boeck et al. | 451/352 |
| 2009/0130961 A1* | 5/2009 | Boeck et al. | 451/344 |

FOREIGN PATENT DOCUMENTS

| | | |
|---|---|---|
| DE | 43 22 284 A1 | 1/1995 |
| DE | 10 2006 022 386 A1 | 11/2007 |
| DE | 10 2006 053 301 A1 | 5/2008 |
| DE | 10 2007 041 840 A1 | 5/2008 |

* cited by examiner

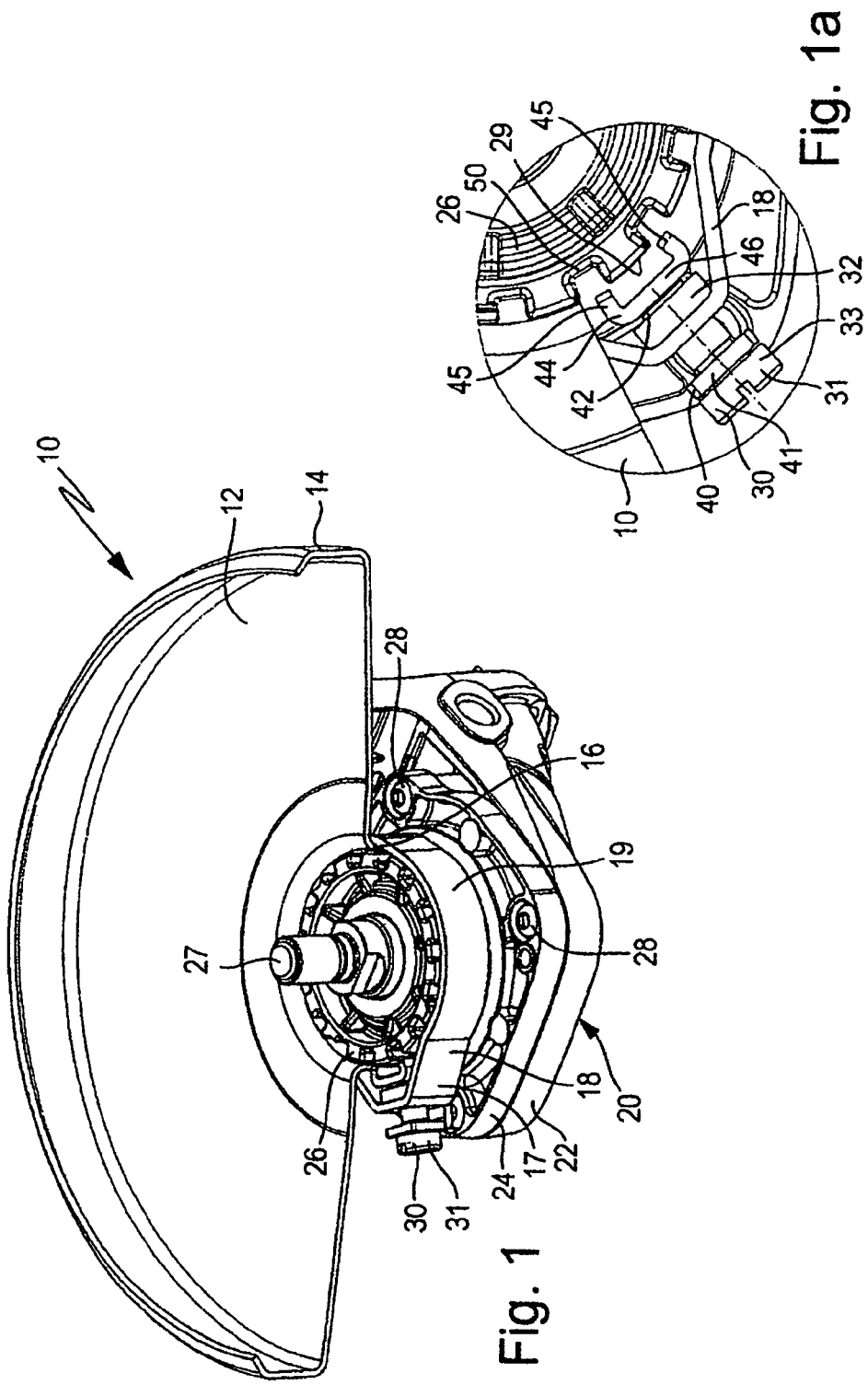

PROTECTIVE HOOD FOR PORTABLE ELECTRIC POWER TOOLS, AND PORTABLE ELECTRIC POWER TOOLS

RELATED PATENT DATA

The present application claims priority from German Patent Application Serial No. 10 2009 017 299.8, and which was filed on Apr. 11, 2009, and PCT/EP2010/002187 and which was filed on Apr. 8, 2010.

The invention relates firstly to a protective hood for a portable electric power tool, and in particular to an angle grinder, and which comprises a protective hood plate which at least partly covers a disk-shaped, rotating tool and which extends perpendicularly to a protective hood collar, and wherein the protective hood can be fixed to a machine neck using the protective hood collar, and the protective hood collar has a clamping band, by which it can be tightened by a clamping means, and wherein at least one form-fitting anti-rotation locking element is provided which acts between the protective hood collar and the machine neck, and which further interacts with a corresponding element of the machine neck. Secondly, the present invention relates to a portable electric power tool.

In the case of portable electric power tools, a protective hood is often provided and prescribed, said protective hood having the task of keeping sparks or material particles away from the operator that are flung away from the rotating tool, e.g. a grinding or cut-off disk, during work. In addition, the protective hood is intended in particular to ensure that parts of the grinding tool do not strike the operator of a portable electric power tool in the event that the grinding tool was destroyed. Here, provision is generally made for the protective hood to cover only a restricted angular region of the disk-shaped tool. More specifically, and as a general rule, approximately 180° of the rotating tool. This generally ensures sufficient protection during the various work assignments. Since, however, depending on the work assignment, there are different angles of application of the tool, it is often desirable for the protective hood to be designed to be adjustable with regard to its rotary position relative to the machine housing. Thus, for example, in a rest position, the protective hood is usually provided symmetrically to the housing longitudinal axis on that side of the grinding tool that points in the direction of the machine housing. Depending upon the operating position, however, it may also be desirable for other regions to be covered, specifically, as a rule, those regions which lie opposite the actual working region. In order to ensure that the protective hood can be rotated into the requisite protective position by the operator, it is advantageous that the protective hood be adjustable. It is only if an adjustment is not awkward that the protective hood is set in an ergonomically favorable manner and thus the operator is reliably protected even if the tool bursts.

Thus, for example, EP 0 599 030 discloses a portable electric power tool with a protective hood, and wherein the protective hood collar has a clamping band which encompasses the protective hood collar and wherein spring tongues are provided on the protective hood collar, said spring tongues having latching lugs directed toward a spindle neck of the portable electric power tool, and wherein the latching lugs engage in corresponding recesses of the spindle neck when the clamping band is tightened. In this way, form-fitting locking of the protective hood is possible in addition to the fixing via the clamping band.

A further portable power tool is previously known from DE 10 2007 041 840 A1, which describes a protective hood locking means, and wherein the clamping means, for tightening the clamping band in its clamping position, can be repeatedly connected to the machine neck in a form-fitting manner and, in its release position, is disengaged from the form fitting relationship with the machine neck.

Therefore, an object of the present invention, is to provide a protective hood which permits reliable, adjustable fixing of the protective hood even in the event of the tool bursting and which, on the other hand, is of comparatively simple and cost-effective construction and in particular dispenses with complicated lever designs.

The invention achieves this objective by providing a protective hood for a portable electric power tool having the features of claim 1, and wherein the clamping means comprises a radially arranged screw which is mounted on the clamping band, and which is supported directly or indirectly against the machine neck in a fixed state of the protective hood.

In the manner as described above, the protective hood can be fixed to the machine neck of a portable electric power tool in both a form-fitting and frictional fitted manner.

In the manner as described above, a connection made between the protective hood and the power tool is rendered possible in a simple manner in terms of design, and at a low cost, and which further can be produced or released in a time-saving manner by the user with effortless ease by the radially oriented screw being advanced in the direction of the machine neck or by said screw being withdrawn away from the machine neck in the opposite direction. As a result, the clamping band can be tightened with only a small expenditure of force. In this invention, the screw interacts with the clamping band, and in particular with the free end of its shank.

At the same time, it is ensured that, as a result of the anti-rotation locking element as provided, and which acts in a form-fitting manner, the protective hood is fixed nonrotatably on the portable electric power tool, even if it is not tightened very securely, and is also anchored reliably in the set working or protective position in the event of a tool bursting. In this case, the frictional fixing by way of the clamping band protects the protective hood against vibrations when the latter is fixed and locked. Further, in the event that a large force is caused by the bursting of a tool, the form-fitting locking anchors the protective hood in the desired position, even if the locking by the clamping band were possibly not sufficient on its own in this situation.

According to a first embodiment, the earlier mentioned screw can be advanced in radially for tightening the clamping band, and for producing the form fit between the anti-rotation locking element, and the corresponding element of the machine neck and can be withdrawn radially outwardly for releasing the clamping band and for neutralizing or releasing the form fit.

As a result, both the friction grip and the form fit can be provided at the same time by a single activity, namely the adjustment of the clamping means, by advancing the screw radially inwardly or by withdrawing the screw radially, outwardly.

In this case, provision can be made according to a first configuration for the clamping band to be an encircling, closed clamping band. In principle, open clamping bands having two ends not directly connected to one another; and closed or encircling clamping bands can be provided. In this case, the clamping band can have a substantially annular shape, and wherein a loop or protrusion can be incorporated radially outward into the annular shape in the region in which the clamping means is arranged. The clamping means is accommodated in said loop or protrusion. As a result, the clamping band in the region of the clamping means is located further away from the machine neck, thereby facilitating the clamping as earlier described.

In order to fix the screw to the clamping band, a threaded element, such as a nut is connected to the clamping band, in which case said nut can be in particular a square nut. However, alternative configurations are also possible. According to another configuration, provision can be made for a thread to be cut into the clamping band itself, such that the screw can be rotatably affixed in a frictional manner, in the clamping band itself. In this case, it is not necessary for the screw to have a thread over its entire shank length. In general, provision can also be made for the thread to extend only over part of the screw shank, and in particular over the part which is arranged closer to the screw head.

According to another possible embodiment, the free end of the screw shank can act as an anti-rotation locking element. That is to say, when the screw is radially advanced, the free end of the screw shank enters a corresponding element of the machine neck, and in particular a groove, and thereby interacts with the latter for forming a form fit.

According to another possible embodiment, the aforementioned screw can interact with a bracket-shaped anti-rotation locking element having two legs. One leg of the element bears against the screw head of the screw and the other leg of which has at least one latching element for fixing in or cooperating with corresponding elements of the machine neck. In this case, the bracket-shaped anti-rotation locking element has substantially a U-shape, and the one leg bearing against the screw head, and the other leg having one or more latching elements. A latching element can, in this embodiment, be formed by a likewise U-shaped element, such that a connection between the two legs of the U, and that leg of the anti-rotation locking element which has the latching element or latching elements is satisfactorily obtained. In this arrangement, the two legs of the latching elements then act as claws which interact with the corresponding elements of the machine neck and in particular enter corresponding grooves of the machine neck. This arrangement offers the advantage that more than one element of the anti-rotation locking element has a form fit with the machine neck, such that forces are better distributed in the event the hand-tool bursts. In addition, and as a result of the U-shape of the latching element, tilting or movement of the same can be prevented when the connection between the two claws is supported on the machine neck.

In order to also ensure that relative movements do not occur between the individual components during vibrations, occasioned by the operation of an accompanying tool, provision can be made for a compression spring to be arranged between the bracket-shaped anti-rotation locking element and the clamping band, said compression spring resiliently urging the bracket-shaped anti-rotation locking element in the direction of the screw head, such that, when the screw is released or withdrawn, the bracket-shaped anti-rotation locking element follows or moves in the same direction as the screw. In this way, it can be ensured, that when opening and closing the clamping means, that undesirable, and in particular audible noises, do not occur between the respective parts.

The compression spring described, above, can be in particular a helical compression spring which encloses the screw.

If the spring as described, above, is to be dispensed with, a provision can also be made for the bracket-shaped anti-rotation locking element to be connected to the screw, in particular to the screw head. Here, in particular a form-fitting connection, in particular via a retaining ring, can also be provided.

Furthermore, provision can be made for the clamping band to be connected to the protective hood collar in an integral manner, that is, by way of spot welds or a welded seam. In still another possible embodiment, provision can be made for the clamping band to form the protective hood collar.

The present invention also relates to a portable electric power tool, and in particular a power tool for a rotating disk-shaped tool, such as an angle grinder, and which comprises a machine neck which accommodates a drive shaft for the tool, and further including a protective hood of the type described, above. The machine neck includes a flange which is connected to the machine housing. Alternatively, provision can also be made for the machine neck to be fixed to or mounted on the tool housing, for example, by way of a screwed connection. The drive shaft for the tool can in this case be coupled to the motor shaft via an angular gear unit.

Provision is preferably made in this invention for the machine neck to have elements which correspond to the anti-rotation locking elements and which are designed, in particular, as grooves running substantially in the axial direction. The grooves can in this case be arranged uniformly over the entire circumference of the machine neck, or alternatively can be located in certain angular regions, such that the locking of the protective hood in a form-fitting manner is possible only in these angular regions.

It is in this case in particular preferred if a form fit is produced simultaneously by a plurality of elements.

In addition, a fitting aid maybe provided which enables the protective hood to be fitted only in certain angular positions. To this end, the protective hood may include "fitting lugs" which engage in corresponding fitting grooves of the machine neck when fitting the protective hood on the tool. Such fitting grooves can likewise be axially running grooves which have a larger width than the grooves for accommodating the anti-rotation locking elements. The protective hood can be pushed axially onto the machine neck only if the fitting lugs matingly engage in the fitting grooves as provided.

Furthermore, provision can be made for the machine neck to have a circumferential groove which is arranged at a sufficient axial distance from the free end of the machine neck and defines an axial distance of the protective hood from a tool. As soon as the fitting lugs engage in this circumferential groove, free rotatability of the protective hood in any desired position and in particular in a working position is possible, in which case the protective hood can then be rotated into a desired working position and fixed there in a form-fitting and frictional manner as earlier described.

In this position, the screw, as clamping means, is advanced in a radial direction toward the machine neck until the anti-rotation locking element produces a form fit with the machine neck and further advancement of the screw is no longer possible. As a result of this combined clamping and form-fitting locking, quiet operation is ensured and vibrations are compensated for in such a way that they do not lead to a movement of the protective hood relative to the machine while it is in operation.

In the present invention, the clamping which is achieved by way of the clamping band provides for the fixing notwithstanding vibrations, and the protective hood is fixed by the form fit in the event of the grinding disk being destroyed, which is simulated by the burst-wheel test according to DIN EN 60745-2-3. In this test, a grinding disk is made to burst at maximum speed. The grinding disk parts impinging in and on the protective hood may rotate the protective hood only by a maximum angle of 90°. This can be ensured by the additional locking by the form fit at one or more locations.

In the event of a disk bursting, the protective hood attempts to rotate about the axis of the machine neck. However, this is prevented by the form-fitting element being fixed in the grooves of the machine neck. During the aforementioned fitting, care should be taken to ensure that the anti-rotation locking element or elements is/are matingly interfitted with the corresponding parts thereof which produce the form fit. Provided a bracket-shaped anti-rotation locking element as described above is used, a provision can be made for the connecting element to forcibly urge the claws against the circumference of the machine neck.

Tilting of the anti-rotation locking element in the case of a bracket-shaped element can be limited by the edge of the protective hood collar being pressed against the anti-rotation locking element, such that the locking force is increased even further at least on one of the two claws, and said claw is pressed to an even greater degree into the corresponding elements of the machine neck. It is therefore advantageous if an edge of the protective hood collar is urged against the anti-rotation locking element or has only a slight gap relative thereto, such that, during a deformation of the same, it comes to bear against it.

For release, the screw is then unscrewed or radially withdrawn until the anti-rotation locking elements are disengaged from the corresponding mating elements. This position must also be assumed in order to enable the protective hood to be pushed onto the machine neck.

Further advantages and features of the invention follow from the remaining specification and drawings. The invention is to be explained in more detail below with reference to the following drawings, in which:

FIG. 1 shows a fitted protective hood in the not yet fixed state.

FIG. 1*a* shows a greatly enlarged detail from FIG. 1.

FIG. 2 shows a fitted protective hood of the present invention in a fixed state.

FIG. 2*a* shows a greatly enlarged detail from FIG. 2.

Figure 4:
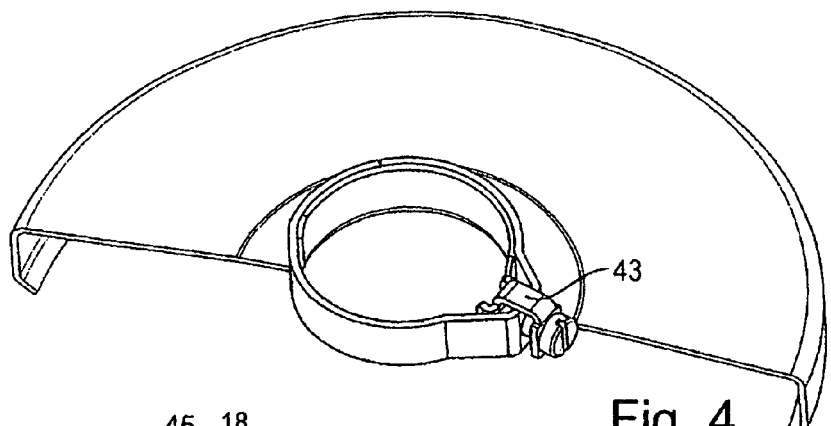
FIG. 4 shows an assembled perspective view of the protective hood according to FIG. 3 in the not yet fixed state.
Figure 4A:
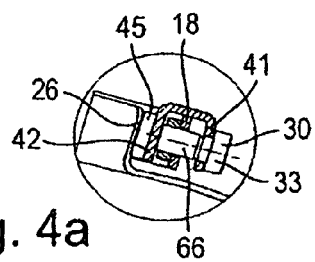

FIG. 4*a* shows a fragmentary, enlarged, transverse vertical sectional view taken from FIG. 4.

Figure 5:
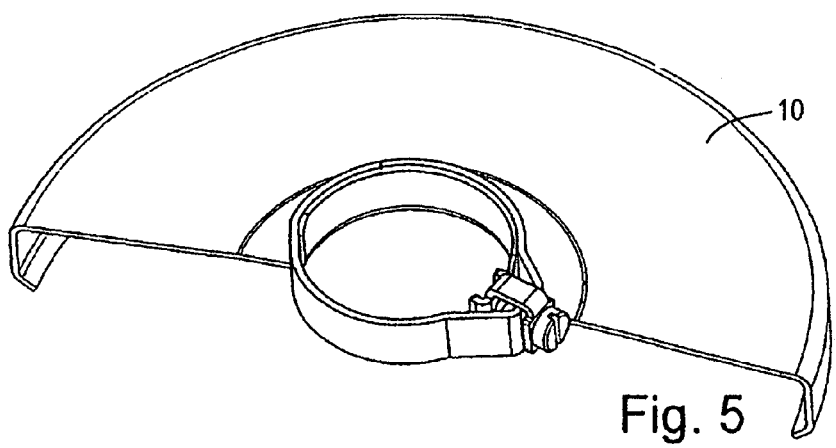

FIG. 5 shows an assembled, perspective view of the protective hood in the fixed state.

Figure 5A:
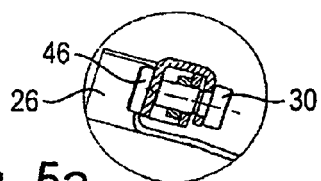

FIG. 5*a* shows a fragmentary, enlarged, transverse vertical sectional view taken from FIG. 5.

FIG. 1 shows a protective hood which is designated overall by the reference numeral 10. Also shown in this view is part of a portable electric power tool 20, here an angle grinder, comprising a machine housing 22, a machine neck 26 which is secured thereto and which comprises the actual machine neck 26 and a flange 24 for securing to the machine housing. The flange 24 and the machine neck 26 are typically connected in one piece. They are secured via screwed connections 28, a total of four screwed connections being provided on the flange 24. The machine neck 26 has a substantially cylindrical shape and extends coaxially relative to the axial direction of a drive shaft 27, which is guided in the machine neck 26, and with which a tool, in particular, a cut-off or grinding disk, is driven.

The protective hood 10 comprises a protective hood plate 12 which extends substantially in the radial direction relative to the axis 27. The outwardly pointing edge 14 of the protective hood plate 12 is angled in the direction of a tool (not shown) in order to ensure better protection and a better enclosure for the tool. In addition, the protective hood 10 comprises a protective hood collar 16 (FIG. 3) with which the protective hood 10 can be detachably secured to the machine neck 26. In this case, the protective hood 10 can be secured to the machine neck 26 in various discrete angular positions in order to be able to cover as well as possible a large number of different working positions with the angle grinder and the associated angular positions of the protective hood, respectively.

In this case, the protective hood 10 is essentially arranged in such a way that it is oriented opposite to a working region of the angle grinder in order to protect the operator from parts that may potentially break away from the angle grinder, and from flying sparks. In addition, a clamping band 18 is provided on the protective hood collar 16. This clamping band 18 is a closed clamping band which encircles the entire machine neck 26. This clamping band 18 has an annular section 19 (FIG. 1) and a loop-shaped region 17 protruding radially outward therefrom. A clamping means 30, is formed by a screw 31 and is provided in the region 17. The screw 31 in this invention extends in the radial direction relative to the axis of the drive shaft 27.

The protective hood 10 is frictionally fixed to the machine neck 26 of the portable electric power tool by way of the clamping band 18.

FIG. 1*a* now shows the detail of the clamping means 30, and of the fixing of the protective hood 10 to the machine neck 26. To this end, the screw 31 is connected via a nut 32, which is shown here as a square nut, and which can cooperate with the clamping band 18, or be made integral therewith, but can also be arranged separately from the clamping band 18. The screw 31 passes through an opening 62 which is formed in the clamping band 18. In this case, the screw 31 threadably engages the thread of its screw shank with the nut 32. Furthermore, a substantially U-shaped form-fitting anti-rotation locking element 40 is provided, and which has one leg 41 which bears against the head 33 of the screw 31; and its other leg 42 is connected to a another U-shaped element 44 which forms a latching element 44. The latching element 44 has two latching claws 45 which is best seen in FIG. 1*a*.

Elements cooperating with the anti-rotation locking element 40 include grooves 50 running in the axial direction relative to the drive shaft 27. The claws 45 of the anti-rotation locking element 50 can matingly engage or otherwise be received in said grooves 50. The spacial distance between the claws 45 corresponds about to the distance between the grooves 50, such that both claws 45 are always in engagement with a groove 50 when the protective hood 10 is appropriately attached. The connecting element 46 (FIG. 3) which connects the two claws 45 to one another then bears against the outer circumference 29 of the machine neck 26 and is supported thereagainst and thus secures the latching element 44 against tilting forces which might be imparted to same.

Furthermore, a compression spring (not shown) can be arranged between the clamping band 18 and the anti-rotation locking element 40. The spring can ensure that the anti-rotation locking element 40 is always spring biasingly loaded with its leg 41 in the direction of the screw head 33 of the screw 31.

FIG. 1 now shows an illustration in which the protective hood 10 can be pushed onto a machine neck 26 in a generally co-axial direction. To this end, the clamping means 30, namely the screw 31, must be "open", i.e. the screw 31 must be unscrewed radially and withdrawn outwardly as far as possible. This ensures that the claws 45 no longer collide or cooperate with the machine neck 26. This is best seen in FIG. 1*a*.

To push on the protective hood 10 in the co-axial direction, it is now necessary for the protective hood to be fitted in a certain position so that fitting lugs provided radially on the clamping band 18 or on the collar 16 of the protective hood 10 can engage in grooves on the machine neck 26, which are provided for this purpose but are not shown here. The protective hood 10 is then pushed axially onto the machine neck 26 until the fitting lugs are located in a circumferential groove in the machine neck 26. In this position, the protective hood 10 can be brought into a desired position by being rotated. The protective hood 10 can then be fastened in this desired working position in a manner that is safe to operate. Once this is achieved, the screw 31 is threadably advanced radially inwardly. As a result of this movement, the anti-rotation locking element 40 is likewise moved in a radial inward direction toward the machine neck 26 until the claws 45 engage or otherwise cooperate with the respective grooves 51. In this process, appropriate fitting can be effected only when each of the claws 45 are engaged in separate grooves. Fitting in an intermediate position is not intended by this invention.

Figure 2A:
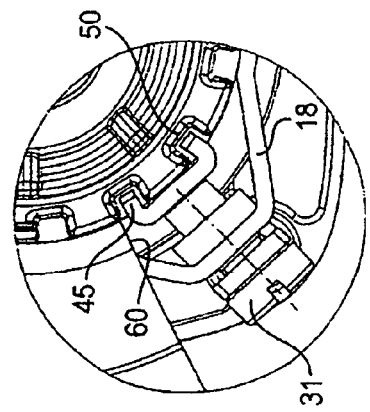
Figure 2:
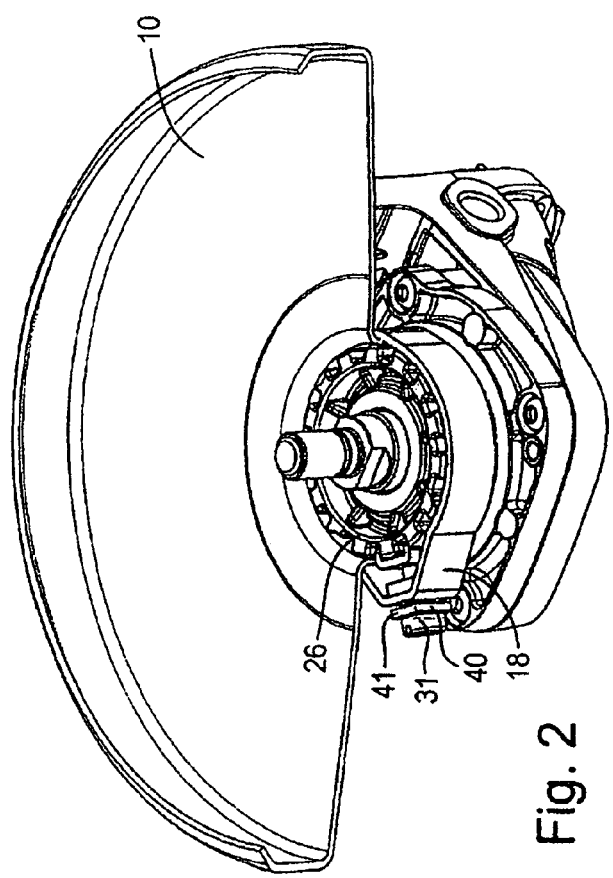

The connection 46 which is located between the claws 45 then bears tangentially against the outer circumference 29 of the machine neck 26. Upon further tightening, i.e. when the screw 31 is screwed in radially, the clamping band 18 is tightened and a frictional connection is achieved between the protective hood 10 and the machine neck 26. Such a fitted and fixed position achieved by the invention is shown in FIGS. 2 and 2a.

As described, above, and in the fixed position, the screw 31 has been radially advanced in the direction of the machine neck 26 until the anti-rotation locking element 40, with its leg 41, bears almost against the clamping band 18, only still at a distance therefrom due to the compression spring (not shown). In this position, the claws 45, as can be seen in particular from FIG. 2a, engage in the corresponding elements 50 which are defined by grooves, and thus form two mating, form-fitting connections in two grooves 50 arranged next to one another. The screw 31 is further radially advanced until sufficient clamping force is effected and therefore vibrations which arise during operation of the tool do not lead to a movement or unseating of the protective hood 10 relative to the machine neck 26, or result in undesirable chattering and/or an unpleasant handling sensation while using the tool.

The additional form fit via the claws 45 in the adjacent grooves 50 ensures that the protective hood 10 does not rotate even in the event of high loading. For example, in the event of a disk bursting, the protective hood 10 attempts to rotate about the axis of the machine neck 26. This adverse rotation is prevented by the claws 45 which engage in a form-fit with the grooves 50 in the machine neck 26. Additionally, tilting of the anti-rotation locking element 40 is limited by the edge 60 of the protective hood collar 16 being firmly pressed against the anti-rotation locking element 40 in the event of bursting of the tool. The force on the claws 45 is therefore additionally increased, as a result of which at least one of the two claws 45 is pressed to an even greater extent into the groove 50 in the machine neck 26. As a result of the deformation of some parts of the protective hood 10 in the event of a tool bursting, where at the same time the safety function of the protective hood 10 is not reduced, the energy arising in the event of bursting can be reduced in a controlled manner.

In particular, deformation of the anti-rotation locking element 40 occurs during this process.

Figure 3:
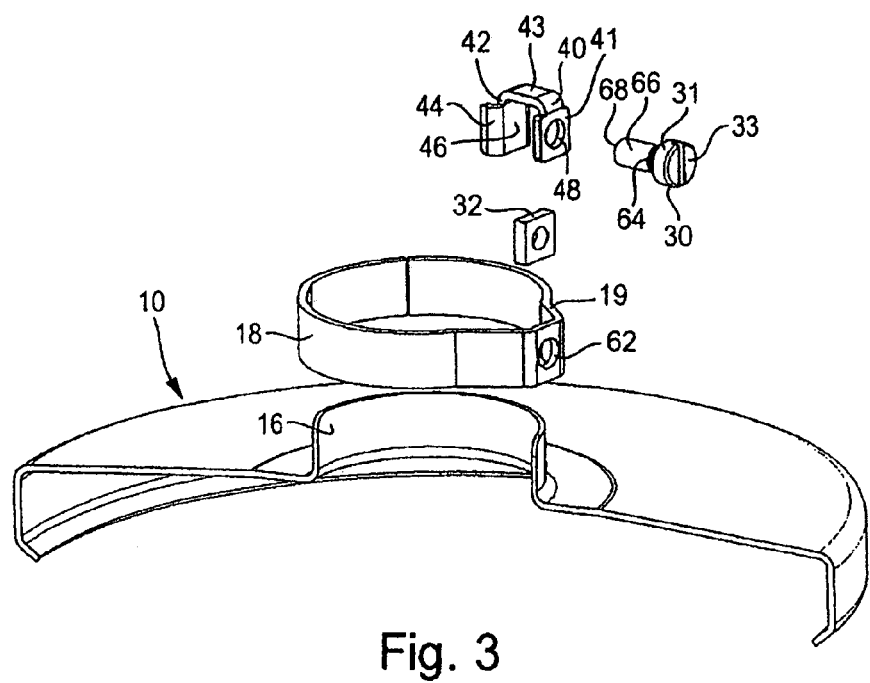
FIG. 3 is an exploded perspective view of the individual parts of the protective hood according to FIGS. 1 and 2.

FIG. 3 now shows an exploded view of the individual parts of the protective hood 10. Here, it can be seen, in particular, that the protective hood collar 16 is clasped over the entire region by the closed clamping band 18. In the region of the protrusion 19 of the clamping band, the square nut 32 is then fixed on the inside against the hole 62 in the clamping band in such a way that the screw 31 can by means of its thread 64 threadably engages the nut 62. At the same time, the anti-rotation locking element 40 with its leg 41, which likewise comprises an opening 48, through which the screw 31 passes, is also arranged between the screw head 33 and the clamping band 18. In addition to the screw head, the screw 31 also includes a screw shank 66 with a free end 68. The screw 31 in operation exerts force on the free end 68 of the screw shank against a region 46 of the anti-rotation locking element 40 and thus causes the element 40 to forcibly move in the radial direction. In this case, the anti-rotation locking element 40 is designed in a bracket shape with its two legs 41 and 42, the latching element 44 being provided in one piece with the leg 42. In addition, the compression spring (not shown) can be arranged between the clamping band 18 and the leg 41.

FIG. 4 now shows the protective hood 10 on its own in an illustration corresponding to FIG. 1, but in a perspective view of the protective hood 10 such that the connecting element 43 between the legs 41 and 42 can be seen. FIG. 4a shows a corresponding detail, that being, the claws 45 here not being matingly received in the machine neck 26 and in the corresponding grooves 50.

FIG. 5 now shows an illustration which corresponds to the clamped position according to FIG. 2, and here, too, the protective hood 10 is shown in a perspective view, as would be seen by the user when actuating the portable electric power tool. It can now be seen in particular in FIG. 5a that the claws 45 have entered grooves 50 of the protective hood neck 26 and are fixed therein. The screw 31 has now been screwed in to the maximum extent in the direction of the machine neck 26.

The clamping band 18 can, in this invention, be attached to the collar 16 of the protective hood 10 by means of spot welding or via a long weld seam. The square nut 32 can likewise be welded to the clamping band 18 or otherwise made integral therewith.

The end face of the screw head 33 comes to bear against the leg 41 of the anti-rotation locking element 40 by screwing the screw 30 into the square nut 32. The provision of the compression spring (not shown) ensures that, in particular when unscrewing the screw 31, the spring in particular being a helical spring which is slipped onto the screw shank 66 of the screw 31, the anti-rotation locking element 40 is always loaded or forcibly biased with slight pressure in the direction of the screw head 33, and therefore follows the screw 31 during the unscrewing or threadable withdrawl. Better manipulation during the fitting is thereby achieved.

In the manner described above, a protective hood 10 can be provided which meets the requirements in the burst-wheel test according to DIN EN 60745-2-3 and is at the same time of simple design and can be produced cost-effectively.

The invention claimed is:

1. A protective hood for a portable electric power tool, and which mounts a disk-shaped rotating tool, and which further has a machine neck, comprising:

a protective hood plate which at least partly covers the disk-shaped, rotating tool and which further extends perpendicularly relative to a protective hood collar, and wherein the protective hood can be adjustably fixed to the machine neck using the protective hood collar, and wherein the protective hood collar has a clamping band which is tightened by a clamping means, and wherein at least one form-fitting anti-rotation locking element is provided which acts between the protective hood collar and the machine neck and which mechanically interacts with the a corresponding element machine neck, and wherein the clamping means further includes a radially oriented screw which is fixed in the clamping band and which exerts force against the machine neck to fix the location of the protective hood.

2. The protective hood as claimed in claim 1, and wherein the screw can be radially advanced for tightening the clamping band and for producing a form-fit between the anti-rotation locking element and the corresponding element of the machine neck and can further be radially withdrawn outwardly for releasing the clamping band.

3. The protective hood as claimed in claim 2, and wherein the clamping band is an encircling, closed clamping band.

4. The protective hood as claimed in claim 2, and wherein the screw is screwed into a threaded element of the clamping band.

5. The protective hood as claimed in claim 2, and wherein a free end of the screw shank acts as an anti-rotation locking element which matingly interacts with the machine neck for making a form fit.

6. The protective hood as claimed in claim 5, and wherein the screw interacts with the anti-rotation locking element which has a first leg which bears against the screw head of the screw and a second leg which has at least one latching elements having at least one latching claw which mechanically cooperates with the machine neck.

7. The protective hood as claimed in claim 6, and wherein a compression spring is located between the bracket-shaped anti-rotation locking element and the clamping band, said compression spring biasingly urging the bracket-shaped anti-rotation locking element in the direction of the screw head, such that, when the screw is screw threadably released, the bracket-shaped anti-rotation locking element follows the screw.

8. The protective hood as claimed in claim 5, and wherein the bracket-shaped anti-rotation locking element is connected to the screw head in a form-fitting manner.

9. The protective hood as claimed in claim 1, and wherein the clamping band is made integral with the protective hood collar.

10. The portable electric power tool as claimed in claim 9, and wherein the corresponding elements which correspond to the anti-rotation locking element comprise grooves which are located coaxially relative to a drive shaft which is borne by portable electric power tool.

11. The portable electric power tool as claimed in claim 10, and wherein the protective hood has fitting lugs which engage axially oriented fitting grooves formed in the machine neck when fitting the protective hood, such that the protective hood can be pushed axially onto the machine neck only in predetermined angular positions of the latter, and wherein a circumferential groove is provided on the machine neck, and receives the fitting legs such that the protective hood can be rotated relative to the machine neck.

12. The portable electric power tool as claimed in claim 10, and wherein the grooves, are arranged substantially uniformly over the entire circumference of the machine neck.

13. The portable electric power tool as claimed in claim 10, and wherein the grooves are arranged only in certain angular regions of the machine neck in order to predetermine certain positions of the protective hood.

14. A protective hood for a power tool which has a rotatable drive shaft mounting a disk-shape tool comprising:
    a machine neck having a circumscribing peripheral edge and which is coaxially outwardly oriented relative to the rotatable drive shaft, and wherein a multiplicity of spaced, radially inwardly extending grooves are formed into the circumscribing peripheral edge;
    a protective hood having an integral hood collar for receiving the machine neck therein, and wherein the hood collar is located coaxially outwardly relative to the peripheral edge of the machine neck, and wherein the protective hood partially encloses the disk-shaped tool, and is selectively fixedly rotatable relative thereto;
    a clamping band positioned coaxially outwardly relative to the hood collar and forcibly engageable therewith, and wherein the clamping band includes a looped-shaped member which mounts a threadably engageable member;
    a screw having a threaded shaft which threadably cooperates with the threaded engagement member borne by the clamping band, and wherein the screw can be radially, threadably advanced both toward, and away from the peripheral edge of the machine neck;
    an anti-rotation locking element mechanically cooperating with the threaded shaft, and which is carried radially inwardly, and radially outwardly, relative to the peripheral edge of the machine neck, and wherein the anti-rotation locking element includes claws which are matingly received in the grooves formed in the peripheral edge of the machine neck when the screw is advanced radially inwardly toward the peripheral edge of the machine neck, and wherein the radial advancement of the screw causes the protective hood to become fixed relative to the power tool, and wherein the radial threadable withdrawing of the screw relative to the machine neck permits selective rotatable movement of the protective hood relative to the power tool.

* * * * *